(12) United States Patent
Beshai et al.

(10) Patent No.: US 6,667,956 B2
(45) Date of Patent: *Dec. 23, 2003

(54) MULTI-CLASS NETWORK

(75) Inventors: Maged E. Beshai, Stittsville (CA); James Yan, Nepean (CA)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,345

(22) Filed: May 1, 1998

(65) Prior Publication Data

US 2002/0131363 A1 Sep. 19, 2002

(51) Int. Cl.[7] .............. H04J 3/14; H04J 3/16
(52) U.S. Cl. ............. 370/238; 370/400; 370/468
(58) Field of Search .............. 370/465, 229–235, 370/38 L, 395, 238.1, 256, 389, 408, 401, 400, 238, 468, 254; 340/340.23; 701/220, 221, 223, 224, 225, 226, 239, 241, 243

(56) References Cited

U.S. PATENT DOCUMENTS

| | | | |
|---|---|---|---|
| 4,494,230 A | 1/1985 | Turner | 370/60 |
| 4,884,264 A | 11/1989 | Servel et al. | 370/58.1 |
| 4,926,416 A | 5/1990 | Weik | 370/60.1 |
| 4,962,499 A | 10/1990 | Sennema | 370/94.1 |
| 4,991,204 A * | 2/1991 | Yamamoto et al. | 340/2.23 |
| 5,289,462 A * | 2/1994 | Ahmadi et al. | 370/232 |
| 5,367,518 A | 11/1994 | Newman | 370/54 |
| 5,434,848 A * | 7/1995 | Chimento et al. | 370/235 |
| 5,495,426 A * | 2/1996 | Waclawsky et al. | 370/229 |
| 5,687,167 A * | 11/1997 | Bertin et al. | 370/254 |
| 5,745,694 A * | 4/1998 | Egawa et al. | 709/225 |
| 5,748,901 A * | 5/1998 | Afek et al. | 370/232 |
| 5,805,578 A * | 9/1998 | Stirpe et al. | 370/408 |
| 5,838,663 A * | 11/1998 | Elwalid et al. | 370/233 |
| 6,046,981 A * | 4/2000 | Ramamurthy et al. | 370/232 |
| 6,118,791 A * | 9/2000 | Fichou et al. | 370/468 |
| 6,130,875 A * | 10/2000 | Doshi et al. | 370/225 |

* cited by examiner

*Primary Examiner*—Chau Nguyen
*Assistant Examiner*—Andy Lee
(74) *Attorney, Agent, or Firm*—Jean-Pierre Fortin

(57) ABSTRACT

A multi-class digital network is described. The network supports a plurality of digital services using dynamically-configured service bands to support various transport modes and qualities of service. A network control element receives traffic and network state information from the nodes. The network control element maintains a network topology and uses the network topology to compute route sets for the nodes. The network control element uses the traffic information to compute network size specifications. The switching nodes use rate controllers to divide the capacity of each link among the connection classes according to rules which ensure consistent service attributes for each band across the network. The rate controllers are adapted to support different transport modes and different packet sizes so that the deconstruction and reconstruction of packets at network edge devices is eliminated. The advantage is a flexible multi-class network which dynamically reconfigures to service traffic loads as service demands fluctuate.

7 Claims, 10 Drawing Sheets

Destination Node: 11

| From Node | Next Node | | |
|---|---|---|---|
| | Direct | First Set | Second Set |
| 0 | 11 | 5 / 6 | 4 / 7 |
| 1 | | 0 | 2 |
| 2 | | 3 / 5 | 1 / 4 |
| 3 | 11 | 5 | |
| 4 | | 3 / 5 | 2 / 0 |
| 5 | 11 | 3 / 0 | 4 |
| 6 | 11 | 8 / 0 | |
| 7 | | 8 / 0 | |
| 8 | 11 | 10 / 9 / 6 | 7 |
| 9 | 11 | 8 / 10 | |
| 10 | 11 | 9 / 8 | |

FIG. 4

MULTI-CLASS NETWORK

TECHNICAL FIELD

This invention relates generally to multi-class digital networks and, in particular, to a multi-class digital network in which network functions are shared by a network control element and node control elements to ensure efficient utilization of network resources.

BACKGROUND OF THE INVENTION

A multi-class digital network must accommodate traffic having different characteristics, quality of service (QOS) requirements, and transport modes. For example, a multi-class backbone network may be required to support both connection-based traffic and connectionless traffic. Further complication is traffic may include several classes differentiated by their characteristics and service requirements. The traffic classes may require different and possibly conflicting controls in order to satisfy service commitments and ensure acceptable service quality.

Asynchronous Transfer Mode (ATM) switching technology was developed to provide multi-service digital transport. It was assumed that ATM networks would provide the flexibility and quality of service required to satisfy the demand for digital services.

One disadvantage of ATM networks is that they are adapted to transport packets of only one size and format. Consequently, the packets of services which do not use ATM format must be deconstructed on admission to the ATM network by network edge devices and reconstructed by network edge devices on egress from the ATM network. This slows service delivery, increases computational requirements and complicates the structure and functionality of edge device interfaces.

The varying service requirements in a multi-class network are difficult to satisfy without traffic segregation and network partitioning. For example, certain services such as voice and video are somewhat loss tolerant but delay intolerant, while other services such as the exchange of data packets between computers are quite delay tolerant but completely loss intolerant. In accommodating such variations in service, a multi-service network naturally segregates into a plurality of layers or "bands" which respectively serve the requirements of different types of traffic. This natural division of a network into service bands is well understood and has been widely discussed in the relevant literature.

A challenge in network management is designing network routing and admission controls to manage the service bands in a multi-class network to efficiently accommodate fluctuating service demands. It is well understood that while total network traffic may change relatively slowly over time, the traffic mix in a multi-class network may fluctuate rapidly and unpredictably. To date, efficient methods of accommodating rapid and unpredictable fluctuations in traffic service demand have eluded network designers and traffic managers. There therefore exists a need for a multi-service, multi-class digital network and methods for controlling the network which can accommodate the increasing demand for digital services without unreasonable investment in network infrastructure.

SUMMARY OF THE INVENTION

It an object of the invention to provide a multi-class digital network which includes a network control element for performing network-wide functions including network topology monitoring and computation and distribution of network traffic routing sets to network nodes in response to changes in network topology.

It is a further object of the invention to provide a multi-class digital network in which node control elements perform distributed traffic admission control, traffic routing and service-rate allocation for each class of service served by an egress link when traffic connections are set up through the egress link.

It is yet a further object of the invention to provide a multi-class digital network in which service-rate controllers are adapted to control egress on an egress link, the service-rate controller receiving service-rate allocations from associated node control elements.

It is yet a further object of the invention to provide a multi-class digital network wherein the network is a multi-service network adapted to transport digital packets that require different transport modes, each transport mode consisting of at least one transport protocol.

It is another object of the invention to provide a multi-class digital network wherein a network control element also performs network sizing computations which produce periodic specifications for inter-nodal link sizes.

The invention therefore provides a multi-class digital network, comprising:

a network control element which periodically receives network traffic and network state information from network nodes, the network control element performing at least the functions of:
   a) network topology monitoring; and
   b) computing and distributing network traffic routing sets to network nodes as required;
  node control elements which perform at least the functions of:
   a) traffic admission control;
   b) connection routing; and
   c) computation of a service rate allocation for a class served by an egress link when a new traffic connection is set up through the egress link; and
  a service rate controller adapted to control egress on the egress link, the service rate controller receiving the service rate allocations from an associated node control element after they are computed.

The invention also provides a network control element for a multi-class digital network, comprising:

at least one connection with the network adapted to periodically receive network traffic and network state information from node control elements in the network;
  at least one algorithm for maintaining a current network topology using the network state information; and
  at least one algorithm for computing routing sets for switching nodes in the network based on the network traffic and network state information.

The multi-class digital network in accordance with the invention distributes the network processing load between a network control element which handles global functions that are best performed at the network level and traffic functions which are best performed in a distributed fashion at the node level of the network. This distribution of functionality minimizes computational effort and maximizes transmission efficiency.

The network control element in accordance with the invention receives traffic intensity and network state information from the nodes in the network which periodically report such information to the network control element. Using the network state information, the network control element maintains a network topology. The network topology and the traffic intensity data are used by the network control element to compute network traffic routing sets which are identified to the nodes along with an order of preference. The computed routing sets are distributed to the network nodes and used by the network nodes in processing traffic admission requests.

The network nodes include node control elements which control traffic admission, traffic routing and the computation of service-rate allocations for classes of traffic served by egress links at the node.

Edge network node control elements receive traffic admission requests from traffic sources. The edge node control elements compute an equivalent bit rate for each traffic admission request based on a novel method in accordance with the invention. In order to minimize further processing when it is necessary to establish a connection across the network, the edge node control element also computes variables which enable subsequent nodes involved in the connection to rapidly compute an approximate equivalent bit rate used in route selection.

The multi-class digital network in accordance with the invention preferably supports a plurality of digital services which may require different transport modes, each transport mode consisting of at least one transport protocol. Since different transport protocols require different packet sizes, a link controller is provided which accommodates variable packet sizes so that packets need not be disassembled and converted to a standard format by edge device interfaces.

The multi-class digital network adopts a service-rate discipline comprising a guaranteed minimum rate per class in order to ensure efficient use of the network while meeting transmission rate and quality of service commitments. In order to minimize computing requirements for routing, high-frequency, low bit-rate traffic is preferably served by paths commonly referred to as direct routes set up through the network. High bit-rate connection-oriented traffic is preferably served by connections set up on demand. Each service type is preferably assigned to at least one class and each class is preferably assigned to a separate band in the network. The bands are dynamically configured and have elastic boundaries which fluctuate with traffic load. Unused time slots accept traffic from any waiting source in a predetermined hierarchical order in which connectionless traffic without a quality of service is served last.

BRIEF DESCRIPTION OF THE DRAWINGS

The invention will now be further explained by way of example only and with reference to the following drawings wherein:

FIG. 4 is a routing table for a destination node 11 shown in FIG. 3;

DETAILED DESCRIPTION OF THE PREFERRED EMBODIMENTS

Figure 1:
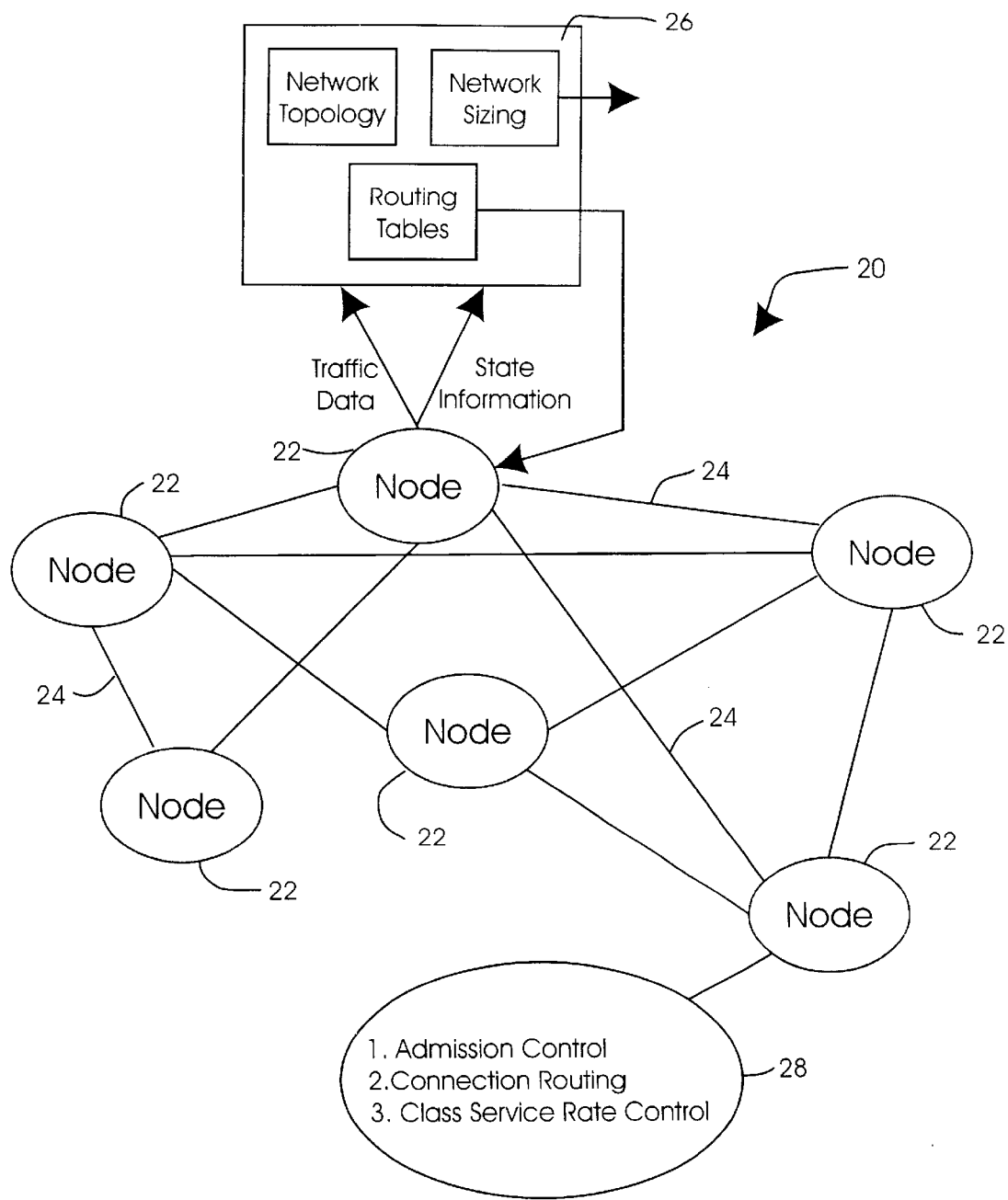
FIG. 1 is a schematic diagram of a multi-class digital network in accordance with the invention.

FIG. 1 is a schematic diagram of a multi-class network in accordance with the invention, generally indicated by the reference 20. The network includes a plurality of switching nodes 22, hereinafter referred to simply as "nodes". The nodes are interconnected by transport links 24, hereinafter referred to simply as "links". The links 24 may be any one of a number of types of transport links well known in the art. The links 24 are designed to support a transfer rate appropriate for the traffic loads that they must transport. The multi-class network 20 in accordance with the invention includes a network control element 26 which preferably performs at least the functions of network topology monitoring, and computing and distributing network traffic routing sets to the nodes 22, as required. The network control element 26 also preferably performs the function of network sizing computations which produce periodic specifications for the sizes of the inter-nodal links 24. The network control element 26 is, for example, a server connected to a one of the nodes 22, or the like.

In the multi-class network 20, other network functions are preferably distributed among node control elements 28. Consequently, the node control elements 28 perform traffic admission control, connection routing for connection-oriented traffic and the computation of service-rate allocations for classes served by egress links managed by a node control element 28. Each of these functions will be described below in detail. Even though only one node control element 28 is shown in FIG. 1, it will be understood that each node 22 includes a node control element 28

The multi-class network 20 may carry classes of traffic having distinctly different characteristics and service requirements. The different service requirements for the various traffic classes are difficult to meet without traffic segregation and network partitioning into layers or "bands". For example, open-loop controls and closed-loop controls have conflicting attributes and require distinctly different handling. Both can, however, operate efficiently in the same network if each control is applied to a separate network band. Connection-based traffic and connectionless traffic also have other distinctly different service requirements. For example, human-to-human communications such as voice and video are somewhat loss-tolerant in that a certain number of packets can be lost without detection by the human participants, yet they are quite delay-intolerant in that any delay or "jitter" in packet delivery is quite noticeable. Data communications between computers on the other hand are quite delay-tolerant but strictly intolerant to packet loss.

Network segregation into bands is preferably done so that each network band corresponds to a traffic class. The same control method applied to a given class should be practised across the network. In order to efficiently use the network, the boundaries between successive bands must be elastic to permit band capacity to expand and shrink in response to variations in network traffic.

Topological design and overall network dimensioning are based on long-term traffic forecasts and other considerations well known in the art. Aggregate network design is a slow process which takes place over time. Network sizing is therefore preferably a function performed by the network control element 26. Network sizing requires traffic characterization. Performance estimation is a function of traffic load and estimates of spatial traffic distribution. Given the difficulty of traffic characterization in a multi-band, multi-service network, effective network sizing computations may be based on traffic and performance measurements. As shown in FIG. 1, the network control element 26 therefore receives traffic measurement data from the node control elements 28. The traffic measurement data is transferred to the network control element 26 through the network. The traffic measurement data is accumulated in appropriate tables and periodically analyzed in order to determine appropriate sizes for the links 24 in the network. The entire network 20 must be provisioned to serve the combined traffic load of all classes. The combined traffic load is, of course, variable over time, however, the combined traffic load is less volatile than the traffic loads of the individual classes. The network traffic data may be sorted to determine traffic loads on each inter-nodal link 24 and the data can be used to determine when a link size is inadequate or when a direct link between unlinked nodes is warranted. Consequently, in addition to traffic data each node control element 28 involved in traffic admission control should report to the network control element 26 the details of admission request denied and the cause of admission failure. The frequency at which an analysis of this data is conducted depends on a number of factors well known in the art, including storage capacity at the network control element 26.

The node control elements 28 also pass network state information messages to the network control element 26 to permit the network control element 26 to maintain topological awareness of the network 20 and its state. In some networks, a topological map of the network is maintained in every node. Consequently, "flooding" of state information is required. This flooding of information uses network resources and ties up node computing cycles. In order to free resources for transport control, in the multi-class network in accordance with the invention, a complete topological network map is maintained only at the network control element 26. To ensure that the topological information is accurate and complete, each link 24 is preferably monitored by each of the nodes 22 at its opposite ends. Consequently, if the status of a link 24 changes, the change is reported by two nodes 22 to the network control element 26. Likewise, the state of each node 22 is monitored by two neighbouring nodes 22 appointed by the network control element 26. If any node 22 malfunctions or becomes inoperable, the network control element 26 appoints alternate monitor(s) for any other nodes that were monitored by that node. This method ensures that the network control element 26 receives accurate network state information to guarantee that network topology is accurate and up to date.

Figure 2:
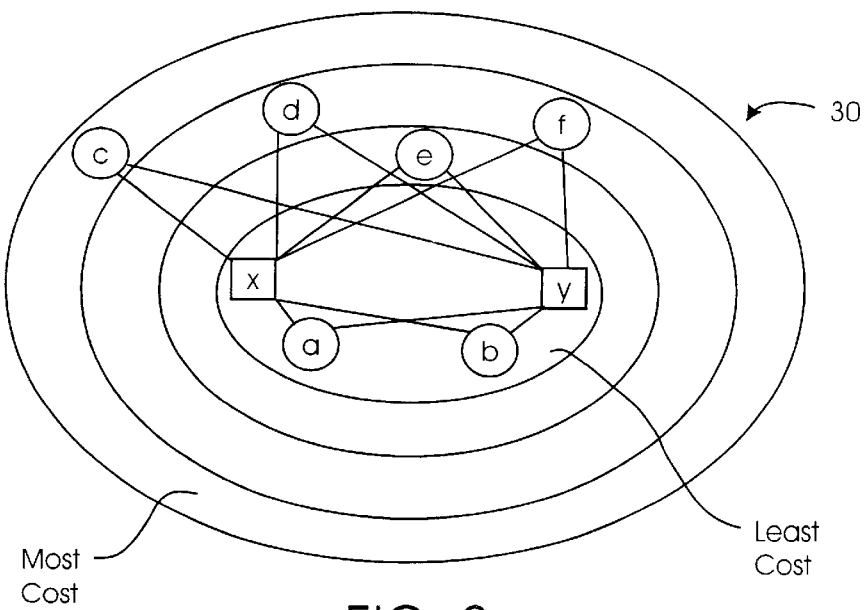
FIG. 2 is a schematic diagram showing cost ellipses used by a network control element to compute routing sets for the network node shown in FIG. 1.

The network topology is used, as required, to compute network routing sets which are used by node control elements 28 to route traffic admission requests across the network. Direct routes, which may include direct links or shortest route paths through the network, are the routes of first preference. Indirect routes from an originating node 22 to a destination node 22 are preferably sorted according to cost ellipses 30 illustrated in FIG. 2. In using the cost ellipses 30 to sort route sets, the origin and destination nodes, X and Y, are placed at the two foci and paths along intermediate nodes are sorted according to cost as determined by an acceptable model. Transport cost models are well known in the art and a number of good models are publicly available. Any path having intermediate nodes which fall between the same elliptical cost boundaries is considered to be of comparable cost. For example, the paths x-d-y and x-f-y in FIG. 2 are of comparable cost and are considered as equal alternatives.

Figure 3:
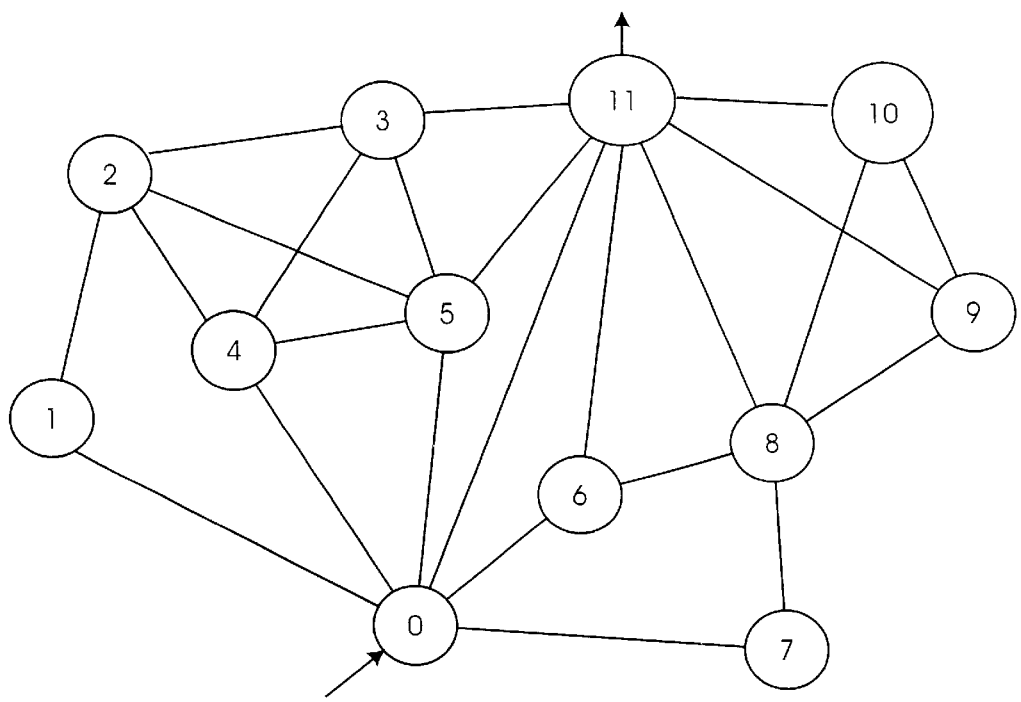
FIG. 3 is a schematic diagram of an example network used to illustrate determining the routing sets for network nodes by a network control element.

FIG. 3 is a schematic diagram of an example network for illustrating the route sets computed by the network control element 26. Each node control element 28 is provided with a list of candidate routes to each destination. The list from node 0 to node 11 includes a direct route, a set of first-choice routes and a set of second-choice routes, etc. The list includes only the first adjacent node along the shortest path to the destination. Routes from each origin to the destination are determined according to cost criteria described above. The routes are sorted according to static cost and assigned a selection priority. Each network node control element 28 maintains a table of routes received from the network control element 26. Whenever network topology changes, the network control element 26 determines which links 24 are affected by the change and recomputes network routing sets accordingly. In order to conserve time and ensure that nodes use effective routing sets, only those links 24 affected by a change in network topology are recomputed. When a new route set is recomputed for any particular network node 22, the recomputed route set is preferably transferred immediately to the associated node control elements 28.

FIG. 4 shows an exemplary routing table computed by the network control element 26 for the destination 11 from each of the other 10 nodes in the network. As is apparent, a direct route is specified whenever it is available. The direct route is always preferred in traffic routing if free capacity exists on that route. As an alternative to the direct route, a first set of lowest-cost routes is specified. For example, from node 0 to node 11, the first alternate set includes nodes 5 and 6. The network control element 26 specifies only the immediately adjacent node for route selection. As will be explained below, during traffic admission the node control elements 28 select the two immediate links which are least occupied to find a route to service an admission request.

In a multi-class network in accordance with the invention, network traffic is divided into a manageable number of classes, whose definition preferably depends on:

1) the transaction format (synchronous transfer mode (STM), asynchronous transfer mode (ATM), Internet protocol (IP), etc.);
2) the method of transaction processing, e.g., connection-oriented or connectionless; or
3) the method of flow control (open-loop or closed-loop).

The term "transaction" as used in this document is to denote the process of transferring information from a source to a sink in a single session. A class may include several connections of similar traffic or may represent a single connection which has a high bit-rate requirement. A class may also include connectionless traffic with no quality of service (QOS) requirements.

Figure 5:
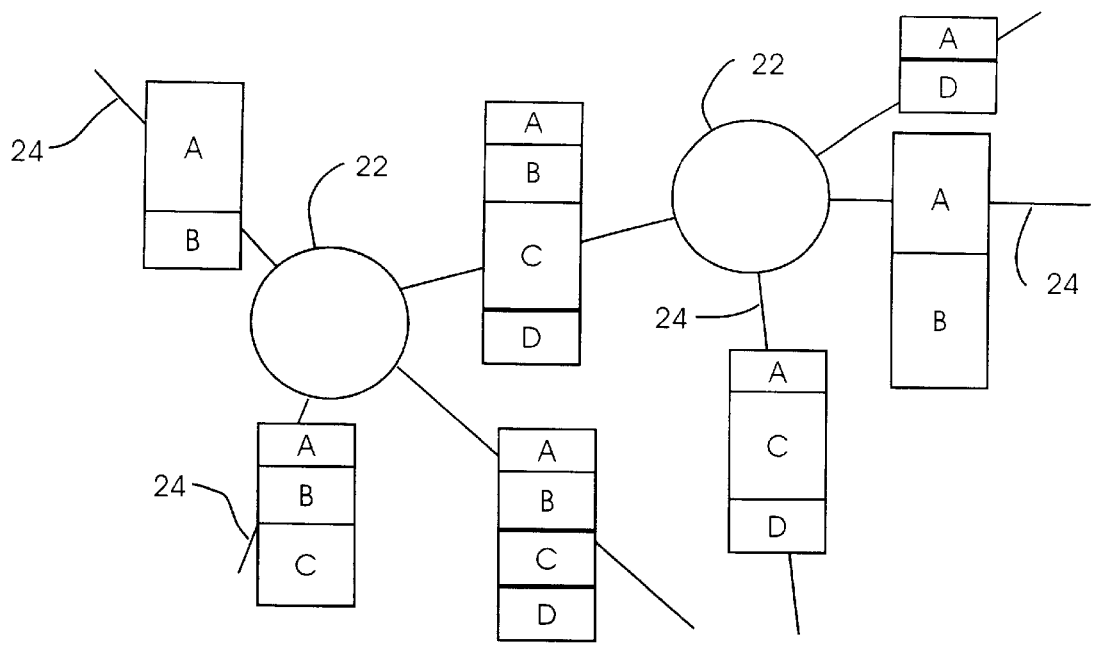
FIG. 5 is a schematic diagram showing network links partitioned into banks corresponding to classes of traffic.

FIG. 5 shows the links 24 of a network node 22 partitioned into a plurality of bands, each of which supports one class of traffic. The total capacity of each link 24 is divided among the classes it supports. The links 24 may be partitioned differently since the same mix of traffic is not necessarily transported over each link. Different routing schemes and admission criteria may be applied to the various network bands. For example, a voice service class may use a simple routing scheme while classes of higher-speed connections may use an elaborate state-dependent selective routing scheme as will be explained below in some detail. In addition to the difference in routing and admission criteria, operational measurements, tariff setting and billing procedures may differ among the classes of traffic.

Figure 6:
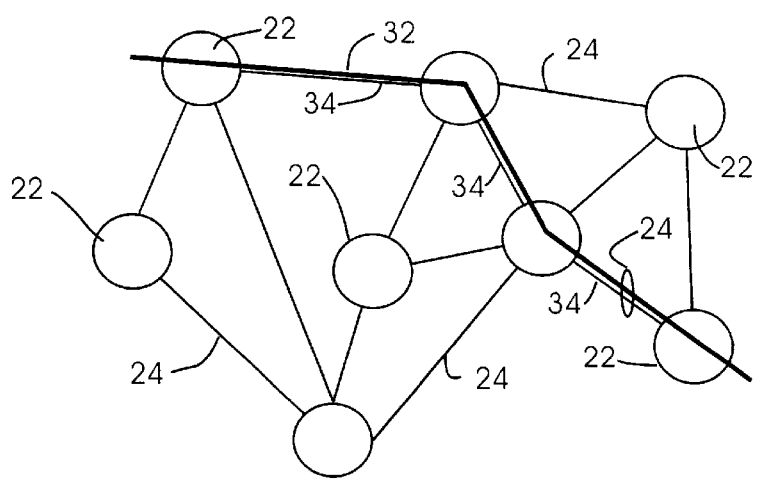
FIG. 6 is a schematic diagram illustrating network paths and network connections through a sample network.

In order to maximize transport efficiency and minimize processing load, at least certain classes of traffic preferably use paths through the network for traffic routing. FIG. 6 schematically illustrates a relation between a path and a connection. In FIG. 6, a solid line through a node indicates a path 32 between non-adjacent nodes and the line connecting nodes indicates a connection 34. A path and a connection may exist on the same link at the same time and within the same class. A path 32 is a reserved route between two nodes 22, possibly traversing several intermediate nodes 22. Intermediate nodes 22 in a path are involved in the path allocation process only when the path is first established or when its capacity allocation is modified. A path 32 may accommodate a large number of connections, possibly several hundreds, between its origin and destination nodes. The originating node 22 views the path as a direct connection to the destination node 22. The intermediate nodes 22 in a path are not involved in the admission of the individual connections belonging to the path 32. A path 32 may serve more than one class of traffic. However, the class definition is only relevant to the end nodes 22.

A connection 34 seeks admission at a specific ingress point in the network. A connection specifies a destination, but there is no fixed route between the originating node and the destination node of the connection. Rather, a route is negotiated when the connection is set up. Each node 22 traversed by a connection is involved in the interrelated decision regarding the admission, or otherwise of the traffic admission request for a connection and the actual selection of the end-to-end route for the request.

Paths and connections may or may not have a capacity reservation. A capacity reservation is necessary to achieve a specified QOS. Without a capacity reservation, the QOS is based only on a weighted priority, or some other class differentiation, and the path 32 or connection 34 are used only to facilitate the forwarding of packets at the nodes.

Figure 7:
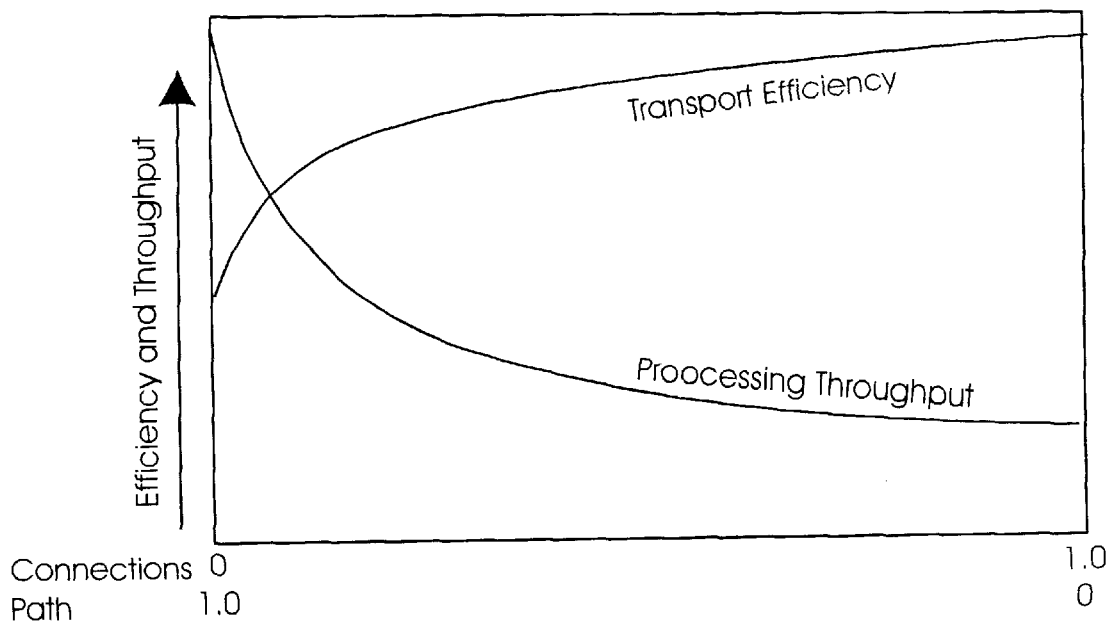
FIG. 7 is a graph illustrating the relationship between transport efficiency and processing throughput in relation to a network which uses connections or paths.

As shown in FIG. 7, paths maximize processing throughput since admission control may be handled exclusively by an edge node which receives a traffic admission request. Establishing paths, however, is not the most efficient use of network resources unless adequate stable traffic exists to keep the path full. In general as shown in FIG. 7, transport efficiency decreases as the paths' allotment in the network increases. Conversely, transport efficiency increases with the increase in the connections' allotment, however processing throughput is significantly affected.

Figure 8:
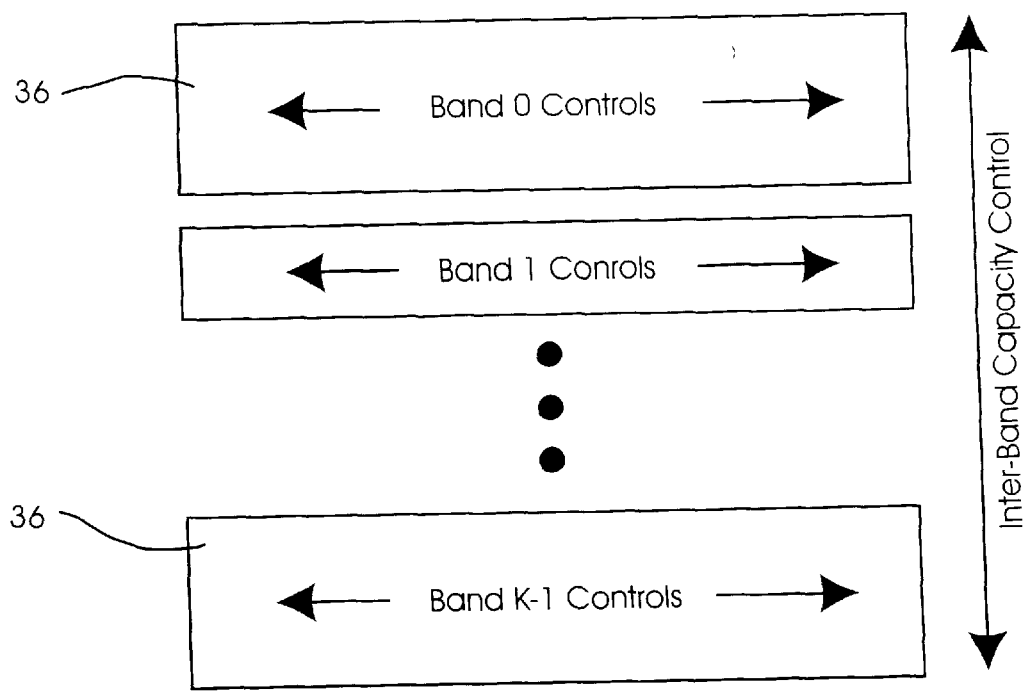
FIG. 8 is a schematic diagram depicting intraband and interband controls in a multi-class digital network in accordance with the invention.

In the network 20 in accordance with the invention, flexible controls which permit two degrees of freedom are realized by employing adaptive routing in addition to adaptive network partitioning. The two degrees of freedom are depicted in FIG. 8 which illustrates the intra-band and inter-band controls that may be used in a network 20 in accordance with the invention. Within each network band 36, adaptive alternate routing may be used to balance the traffic intensity across the network and thereby increase the efficiency of the band. The elastic boundaries of a band 36 may vary slowly, typically in seconds, between successive changes while adaptive routing is applied on a per-connection basis. The two degrees of freedom compliment each other to ensure a balanced, efficient network. The principal control element within a band is the routing scheme. State-dependent routing results in load distribution across the network band. The load distribution is further improved with selective state-dependent routing.

As will be explained below, the network nodes 22 use rate controllers to divide the capacity of each link among the network bands 36 in accordance with predefined rules. Because a large proportion of connections traverses more than one link 24 in the network 20, the rate allocations for the bands cannot be done independently at each node. The rate allocations must be coordinated amongst the nodes in order to ensure that the physical constraints of the link capacity are observed and that end-to-end service requirements are met.

As described above, a network band 36 may include both paths 32 and connections 34. Low bit-rate admission requests which occur at high frequency are prime candidates for paths 32. High bit-rate connections which are requested at a low frequency are better served by independent connections 34. By appropriately selecting path sizes, and with proper splitting of traffic between paths 32 and connections 34, a network divided into bands 36 with elastic boundaries can be almost as bandwidth-efficient as a fully shared network, while call processing load is reduced and QOS differentiation is facilitated. The word "bandwidth" as used in this document is intended to denote capacity in bits/second.

The prior art approach to configuring a communications network has been to seek an optimal trade-off between transport efficiency and processing efficiency. Consequently, traffic was divided between a set of paths 32 and connections 34. Paths 32 consume less processing resources than connections 34. However, due to the random fluctuations of traffic intensity, a path 32 may occasionally suffer from low utilization. This is particularly the case for low-intensity traffic streams which are normally quite variable in their volume. Connections 34 require more processing capabilities due to the signaling load and processing at one or more intermediate nodes 22.

Figure 9:
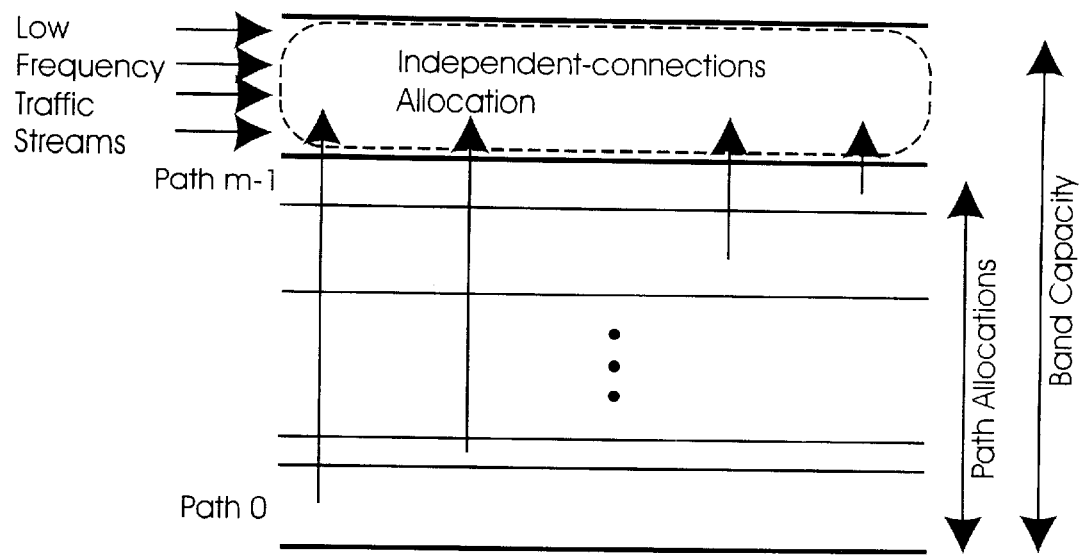
FIG. 9 is a schematic diagram illustrating capacity management in a multi-class digital network with paths and connections where connection-level sharing is practised.
Figure 10A:
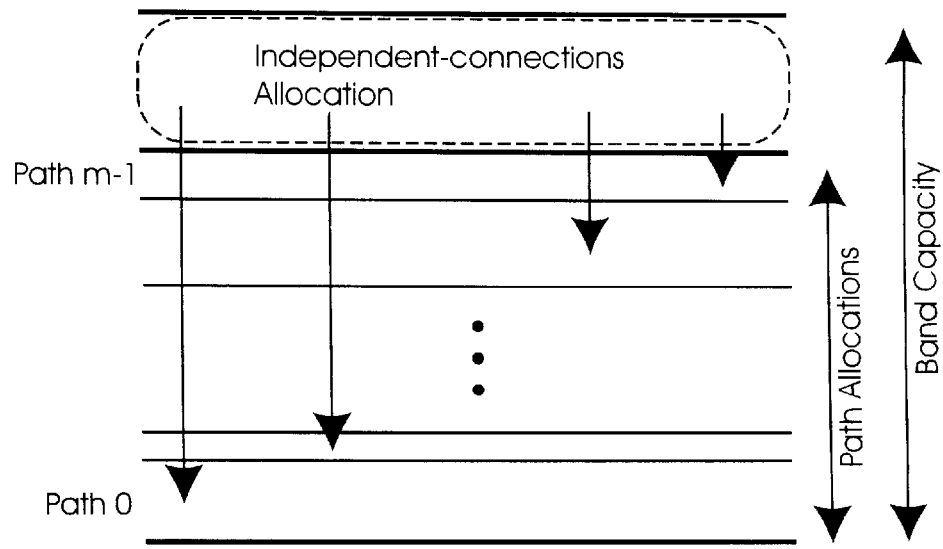
FIG. 10a is a schematic diagram illustrating capacity management with paths and connections in a network link.

The traffic efficiency of a path 32 can be increased by allowing limited queuing of traffic admission requests at edge nodes. Normally, if a path 32 does not have sufficient free capacity to accommodate a traffic admission request, the traffic admission request is either overflowed to a connection band or it is refused. However, permitting traffic admission requests to wait until a sufficient free capacity in the designated path becomes available, or a time-out threshold is reached, significantly improves the path utilization while decreasing overall network processing effort. A compromise arrangement in accordance with the invention is to use paths 32 to reduce processing effort combined with a shared capacity allocation for connections 34. Such an arrangement is shown in FIG. 9. Traffic admission requests that occur too infrequently to justify establishing a path 32 may use the connections allocation. As shown in FIG. 9, several paths are permitted to overflow to the connection allocation which may be within the same network band 36. Each of the paths shown in FIG. 9 is sized to accommodate most of the traffic between its end nodes. At the connection level, traffic admission requests allocated to a path may overflow to the shared connection allocation if the path cannot accept the admission request. At the data level, packet-type connection traffic may use vacant time slots allocated to paths, as illustrated in FIG. 10a. This significantly increases the traffic capacity of the link and brings the overall bandwidth efficiency closer to that of a fully-shared link without affecting the path's performance. The optimal splitting of a link capacity between paths and connections is determined dynamically to follow the traffic load variation.

Figure 10B:
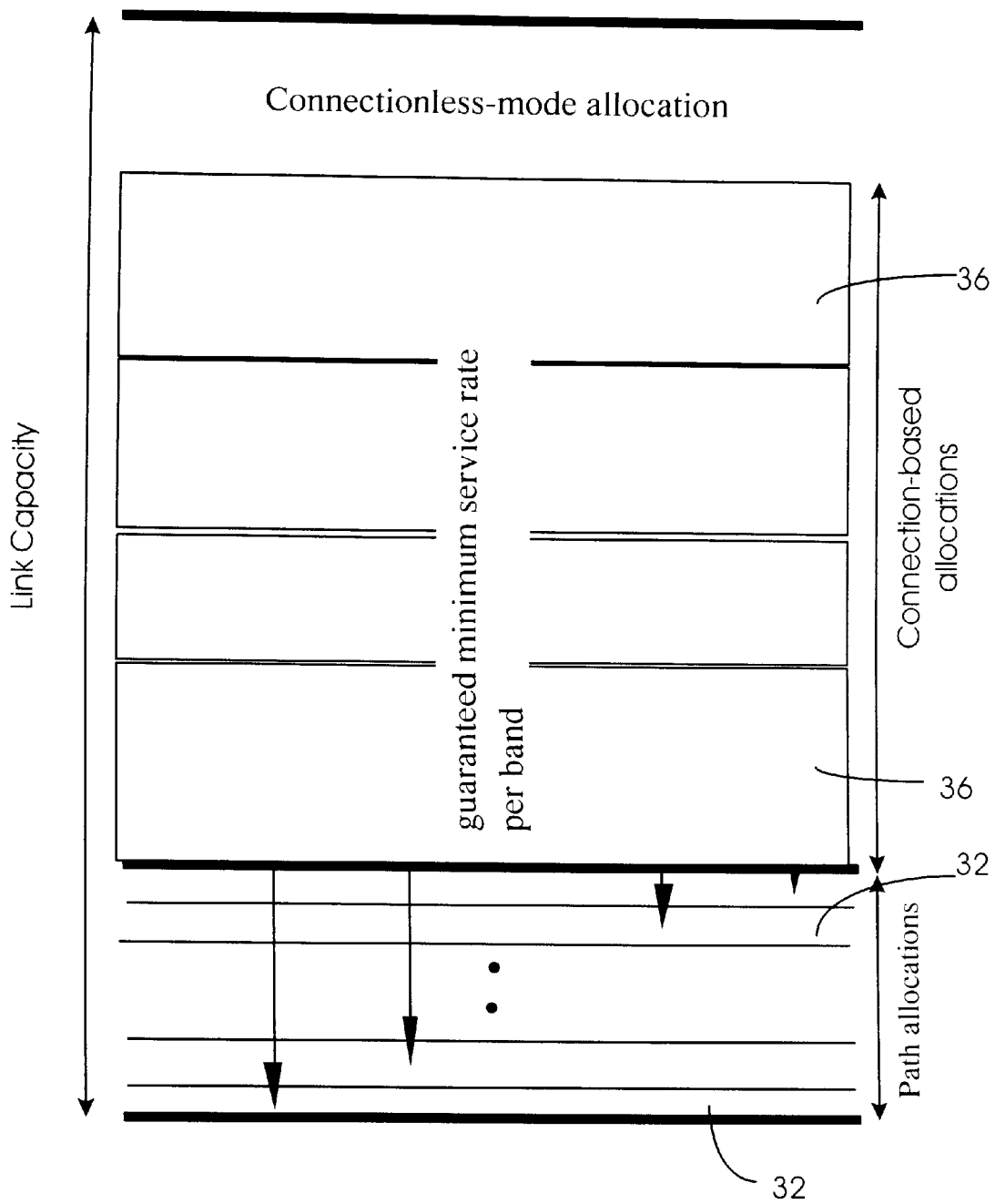
FIG. 10b is a schematic diagram illustrating capacity management, as in FIG. 10a, except that a connection band is not subdivided, and any unallocated capacity is granted to connectionless-mode traffic.

FIG. 10b shows a preferable pattern of partitioning the network transport capacity among the network links. End-to-end paths 32 are used for direct connections, and are established whenever the end-to-end traffic volumes exceed a certain threshold. The remaining capacity in each link, if any, is divided into bands, each of which corresponds to a traffic class. The capacity of each band is dynamically adjusted by the connection-admission process. The capacity of a band increases with each new connection admission, and decreases with each connection departure. Any leftover capacity is used for connectionless-type traffic. The arrows in FIG. 10b indicate that packets belonging to connections of any traffic class may exploit the unused time slots allocated by the rate controller to any path. The reverse is not allowed; packets belonging to a path may not be transmitted during unused time slots allocated by the rate controller to any connection class.

In order to ensure that each traffic class is guaranteed a minimum service rate, it is necessary to provide some form of service-rate controller at the link level. In accordance with the invention there is provided a link service-rate controller shown in FIG. 11 and generally referred to by the reference 50. The combined service-rate allocations for all classes of traffic being served by an egress link must satisfy the condition:

$$0 < f_j = \frac{F_j}{R} < 1, j = 0, \ldots, K-1, \text{ with } \sum_{j=o}^{K-1} f_j < 1$$

wherein:

K is the number of classes;

R is the link rate in bits per second; and $F_j$ is the required service allocation for class j in bits per second; and $f_j$ is the normalized service rate for class j.

Since the allocated service rate per class is less than the link rate, and since it is not possible to transfer a fraction of a packet at any time, it is necessary to wait for several clock cycles to be able to transfer a first packet from a given class buffer. In the link service-rate controller shown in FIG. 11, which shows four classes (K=4), a clock pulse transferred on a clock line 52 provides a clock signal to sampling frequency circuits 54. The clock pulse on clock line 52 is regulated to a predetermined nominal packet size, preferably equal to the minimum sized packet transfer rate of a link 24 served by the link service-rate controller 50. Other clock speeds may also be used. Consequently, the clock pulse can be set to a rate which is some integer multiple of the minimum size packet transfer rate.

Each sampling frequency circuit 54 includes a memory register which stores a class service allocation represented by the character "Δ". This is, hereafter, called the class credit. The value of Δ is dynamically computed for each of classes 0 through K−1. The class service allocation Δ is preferably a floating point number between 0 and 0.99. When a connection admission request is accepted into a class band, an equivalent bit rate (EBR) normalized to the link capacity is added to the value of Δ. When the connection is released, the normalized EBR is subtracted from Δ. The process for computing EBR is described below in detail.

The credit Δ for a given class is the ratio of the required service rate of the class (occasionally called the "bandwidth of the class") divided by the capacity of the link under consideration. For example, the credit Δ of a class requiring a 100 Mb/sec in a link of capacity 620 Mb/sec is approximately:

$$\Delta \approx 0.16.$$

Note that Δ is dimensionless.

The accumulated credit for a given class is to be compared with the normalized packet size. The normalized packet size is the packet length (in bytes, say) divided by a nominal packet size (64 bytes, say) which is applied uniformly for all classes traversing a link. Preferably, the normalized packet size should be standardized across the network using a value of 64 bytes, for example.

Each time a clock signal is received by the sampling frequency circuit 54, the value of Δ stored in the memory register is added by a adder 56 to a memory register which accumulates a class allocation sum. A comparator 58 compares the class allocation sum with the "normalized packet size" 64. If a class buffer 62 is empty, the class allocation sum is set to zero.

Figure 11:
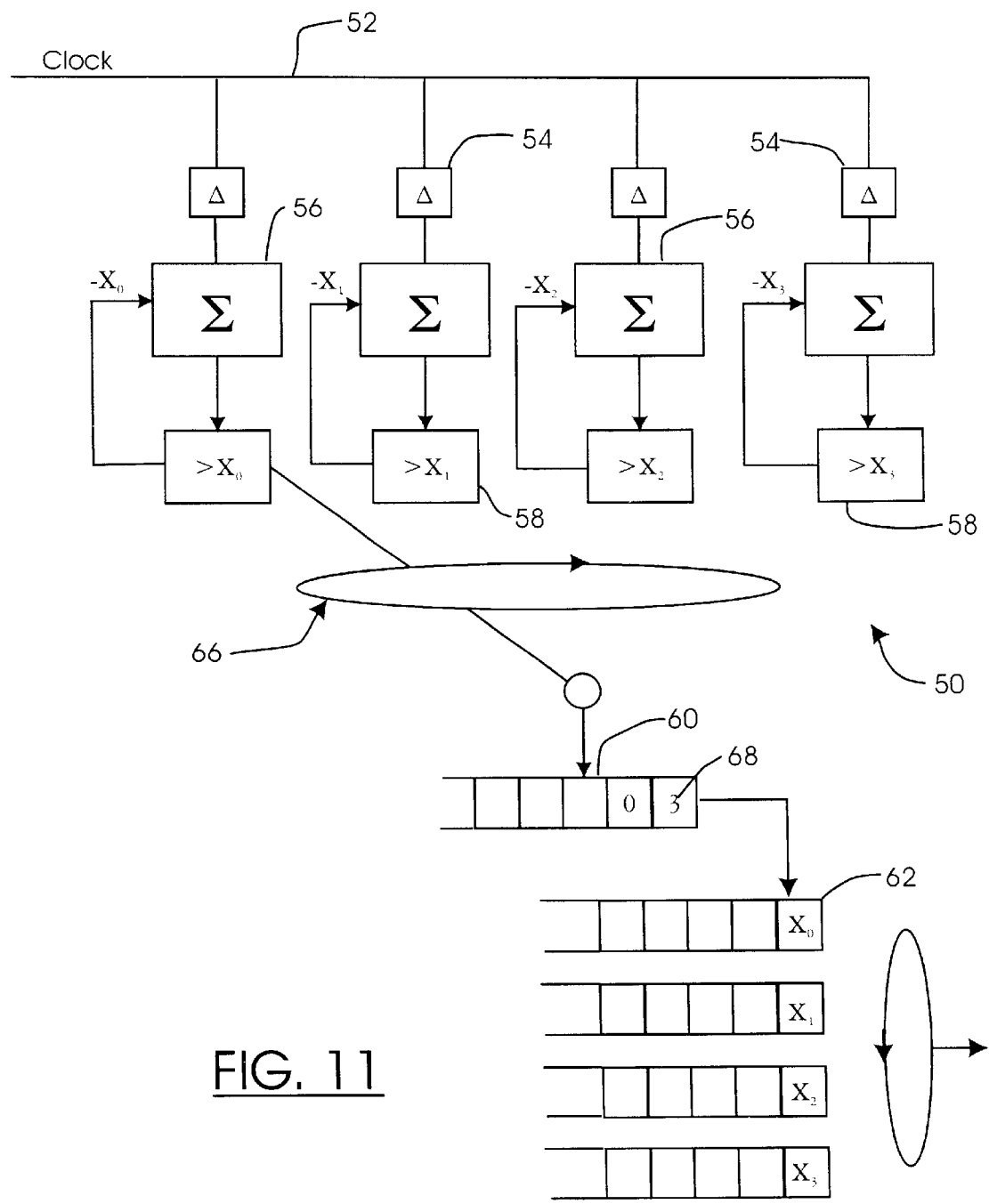
FIG. 11 is a schematic diagram illustrating a rate controller in a node control element for a transport link in a multi-class digital network in accordance with the invention.
Figure 12:
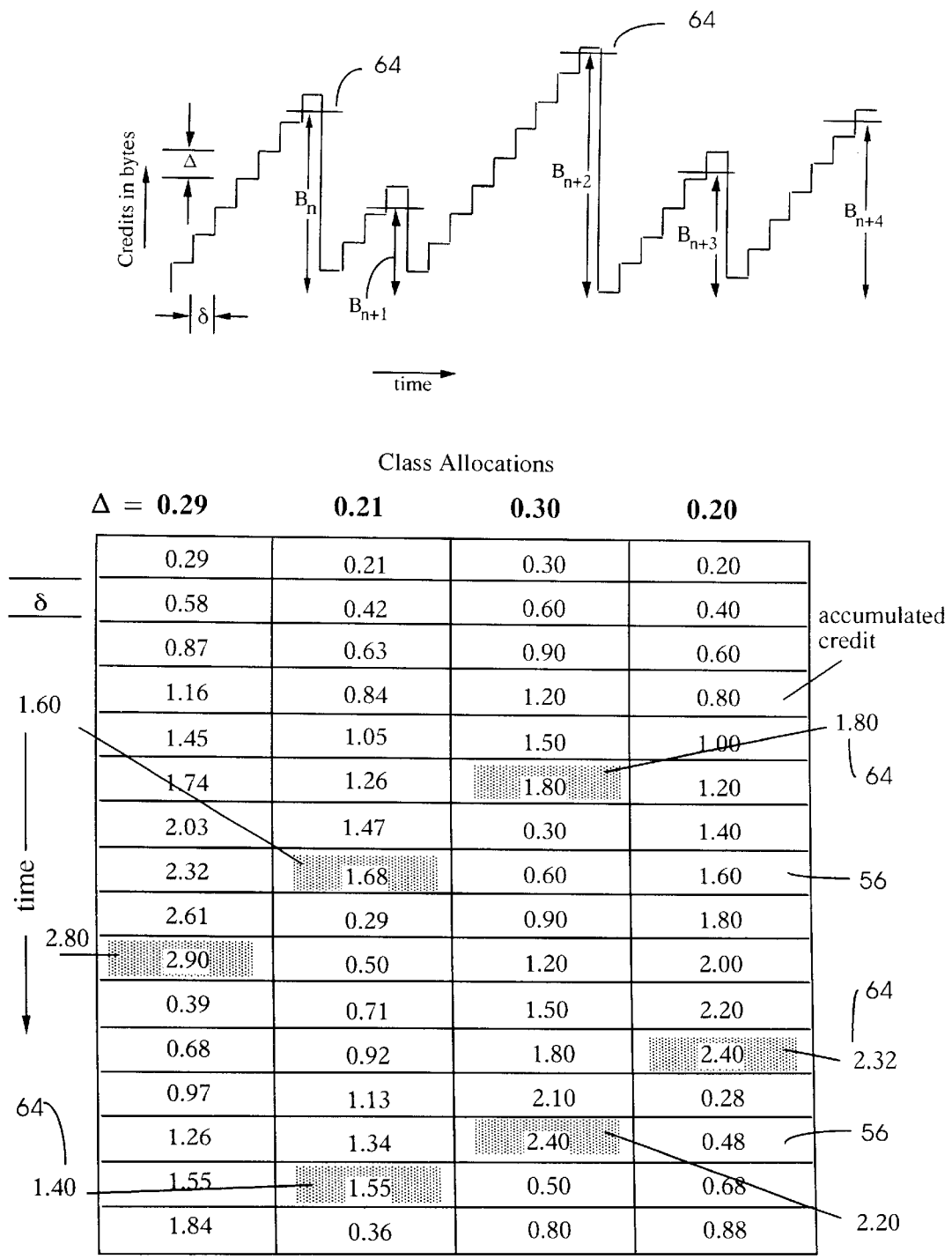
FIG. 12 is a schematic diagram of class allocations for variable packet sizes in a multi-class, multi-service network in accordance with the invention.

FIG. 12 shows a schematic representation of the transmission of packets of variable size. At a top of the figure, a schematic representation of clock cycles is shown. At each clock cycle δ, which equals the transfer time for a predetermined nominal packet size, the value Δ is transferred from the sampling frequency circuit 54 (FIG. 11) to the adder 56. At each clock signal, the comparator 58 compares the value of the memory register in adder 56 with the normalized packet size 64.

The accumulated credit in the adder 56 is stored in the memory register of the corresponding comparator 58 and used for comparison with the contents of adder 56 memory register. When the accumulated sum in the adder 56 is greater than or equal to the normalized packet size 64, a selector 66 writes an eligible class number 68 in the ready queue 60 and the comparator 58 subtracts the normalized packet size 64 from the accumulated sum in the adder 56 so that the balance is added to the class allocation A at the next clock signal, as shown in the table in FIG. 12. When an eligible class number 68 arrives at the head of the ready queue 60, the link service-rate controller 50 selects a packet at a head of the corresponding class buffer 62 and transmits that packet over the link.

If the ready queue 60 becomes empty because there are no classes with a specified QOS to be transferred, traffic without a specified QOS is transferred until another class number 68 appears in the ready queue. In order to ensure equitable treatment, a rotating pointer is preferably used to track a next class to be served when the ready queue 60 is empty.

The traffic transferred through the network is preferably classified by the node control elements 28 into three types: connection-based traffic with a specified QOS; connection-based traffic without a specified QOS; and connectionless traffic without a specified QOS. Each node control element preferably monitors the amount of the connection-based traffic without a specified QOS and assigns it an appropriate service rate if there is an appreciable amount of that type of traffic and there is unused capacity on the link. If the link capacity is required by traffic with a specified QOS, however, the service rate is withdrawn from that traffic.

As noted above, an important aspect of the invention is the distributed control of routing through the network. The network in accordance with the invention preferably supports a plurality of routing disciplines. The preferred routing disciplines are:
1) shortest path hop-by-hop routing;
2) selective routing by a conservative scheme; and
3) selective routing by a true state scheme.

Preferably, the different routing disciplines are assigned to different classes in order to best serve the requirements of the class.

In the shortest path hop-by-hop routing, each node has a list of candidate routes to a destination. The list includes a direct route, if one exists, a set of first-choice routes, and a set of second-choice routes, etc. As described above, the list includes only the next node 22 to a destination along the shortest path. The routes from origin to each destination are determined according to cost criteria, as also described above. Each node only maintains information about the occupancy of its outgoing links. When a new traffic admission request is received at a node 22, the node control element 28 first checks the occupancy of its outgoing link associated with its direct route, if one exists. If the direct route is full or not available, the node control element 28 compares the occupancy state of the outgoing links of the first-choice set of routes and selects the most vacant route. If the available capacity is still not sufficient to accommodate the new traffic admission request, the second-choice set of routes is inspected, and so on. The number of hops to a destination using a given egress port is known by the node control element 28. The edge node control element 28 therefore assigns a number of "route selection credits" to a traffic admission request which is equal to the number of hops along path selected by the edge node to the destination, plus 2 to allow some variation in downstream route selection to accommodate link congestion. The traffic admission request is then forwarded to the next node selected from the routing table. Upon arrival at the next node, the node control element 28 of that node deducts 1 from the route selection credits assigned by the edge node control element 28, and checks the availability of its link to the shortest path to the destination. Each traversed node 22 subtracts 1 from the route selection credits. By ensuring that the number of remaining hops along the path is not greater that the available route selection credits, and by avoiding a return to the immediately preceding node, the route is guaranteed to be cycle-free. By always looking for the most vacant link in the preferred order, the route is guaranteed to be efficient. Shortest path hop-by-hop routing is best suited for low-bit-rate traffic where strict route optimization is not warranted.

For high-volume low or medium bit-rate traffic where more powerful route optimization is warranted, a conservative routing scheme may be used to route connections through the network 20 in accordance with the invention. A conservative routing scheme for ATM networks was published by M. Beshai and J. Yan in November of 1996 at the International Network-Planning Symposium in Sydney, Australia in a paper entitled "Conflict-free Selective Routing in an ATM Network". In accordance with the conservative scheme, when a traffic admission request is received at an edge node 22, the node control element 28 computes an EBR for the connection and examines the availability of its outgoing links in the preferred order to determine which link(s) can accommodate the traffic admission request. On locating at most two available links with adequate bandwidth, the node control element 28 deducts the EBR from the available capacity of each link, computes the route selection credits for the traffic admission request message and forwards the traffic admission request message to the next node(s) in the route path(s). Meanwhile, other traffic admission requests permitted to use the conservative routing scheme are allowed to proceed, even though the prior traffic admission request may be denied at some other point in the network and, consequently, the available capacity of the link(s) may not reflect the true state of the link's current usage. Since only relatively low or medium bit-rate connections use this scheme, the waste of network resources is minimal. The purpose of the conservative routing scheme is to find a lowest-cost route for the connection in a reasonable time without sacrificing too many network resources.

The third routing discipline is a true-state scheme in which traffic admission requests are processed sequentially and, while a true-state connection is being set up, no other traffic admission request is permitted to proceed in the same class of service. A true-state routing scheme for an ATM switching network is described in applicants' U.S. Pat. No. 5,629,930 which issued on May 13, 1997.

When a traffic admission request is received at an edge node and the traffic admission request is determined to belong to a class of service which requires true-state routing, all other traffic admission requests in that class of service are held until a connection for the request is established or denied. In true-state routing, the node control element 28 searches its links in the preferred order for the two links which have the highest free bandwidth to serve the request after the EBR for the connection request is computed. If a link(s) is found, the route selection credits are computed for the traffic admission request and the request is forwarded to a next node(s) in the route. Thereafter processing proceeds as described above until the connection is established or denied because of a lack of link capacity at some point in the route. While the true-state scheme has the advantage of admission given the true bandwidth capacity of the available link(s), it has the disadvantage of delaying the progress of other connections in the same class. Note that connection admission processing for other classes can proceed while a connection belonging to the true-state class, if any, is being processed.

It is estimated that in a typical case about 300 conservative scheme traffic admission requests can be processed per second assuming a processing time of about 1 millisecond per request. For a processing true-state routing, it is estimated that only about 20 requests per second may be processed for an average link length of about 200 kilometers.

Preferably, a network 20 in accordance with the invention uses a hybrid scheme in which true-state routing coexists with conservative routing and shortest path routing. In that instance, true-state routing is limited to connections with high EBR values while conservative routing is used for connections with lower EBR values, in order to increase the permissible attempt rate. Hop-by-hop routing is used for lowest EBR values where there is no value in using resources to find a least-cost route.

As described above, the EBR must be computed for each traffic admission request received at an edge node 22 of the network 20. The value of the EBR is determined by traffic descriptors; QOS; and service rate for the class. The traffic descriptors include a peak rate of emission from the source; a mean rate of emission from the source; and, a mean packet size. These values are generally provided by the source when a traffic admission request is received. In some cases, however, they can only be determined by measurement. A QOS request is submitted with the admission request and defines the delay tolerance and loss tolerance for the connection.

In a single class network, the service rate at an egress port in a node is the entire link rate. In a multi-class, multi-band network where the bands do not share their free time slots the service rate for a class is the capacity allocated to the band associated with the class. Since the service rate fluctuates dynamically, the boundaries between classes are elastic and the capacity per class varies over time. This means that an EBR for a given connection which is computed at a given instant may need to be revised when the band capacity changes. Such recomputation is impractical.

Figure 13:
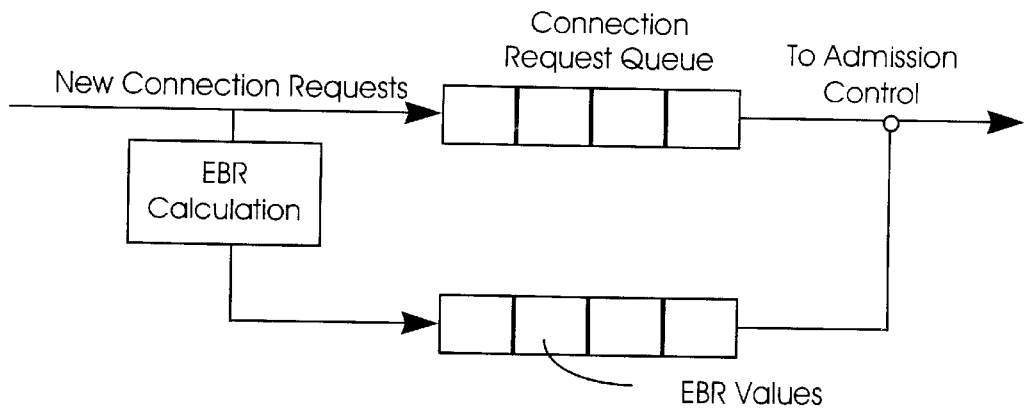
FIG. 13 is a schematic diagram illustrating a preferred arrangement for processing connection admission requests at node control elements in accordance with the invention.

In the method in accordance with the invention, a policy of guaranteed minimum capacity allocation along with sharing among the bands is adopted. The computation of the EBR for a connection in any band can therefore be based on the entire link capacity, thus eliminating the need to revise EBR calculations. When a traffic admission request is accepted, the computed EBR is added to the memory register in the sampling frequency circuit 54 of the link service-rate controller 50 (FIG. 11). When a session ends and the connection is torn down, the EBR is deducted from the memory register in the sampling frequency circuit 54. Thus the size of a band 36 for a class of traffic fluctuates with traffic load. The EBR is readily calculated using, for example, the extended Gibbens-Hunt formula which is known in the art. The computation is preferably completed in the edge node while new traffic admission requests are queued for treatment, as shown in FIG. 13. If the EBR is calculated while the traffic admission request is queued, traffic admission request delay is reduced. In accordance with the method described above for computing EBR, the EBR is dependent on link capacity. It is therefore necessary when setting up a connection through several nodes 22 to compute an EBR at each intermediate node. In order to accomplish this, prior art methods forwarded the traffic descriptors and QOS along with a traffic admission request message, and each subsequent node involved in the admission request recomputed the EBR using the extended Gibbens-Hunt formula which is known in the art. Other methods can also be used. For example, the EBR can be calculated using the Buffet-Duffield formula, as described in U.S. patent application Ser. No. 08/723,649 filed Oct. 3, 1996.

In accordance with the methods of the invention, recomputation is minimized and connection request processing is facilitated by computing parameters which are forwarded with traffic connection request messages that permit subsequent nodes to rapidly compute approximate EBRs. The approximate EBRs are adequately accurate to permit connections to be established with a high level of quality assurance. In accordance with the method, in order to reduce the computational effort, interpolation is used to derive approximate EBRs at subsequent links involved in the processing of traffic admission requests. In a method in accordance with the invention, a hyperbolic interpolation is used to yield a reliable approximation for EBR based on link capacity. Other types of interpolators may be used which could produce equally good results.

Figure 14:
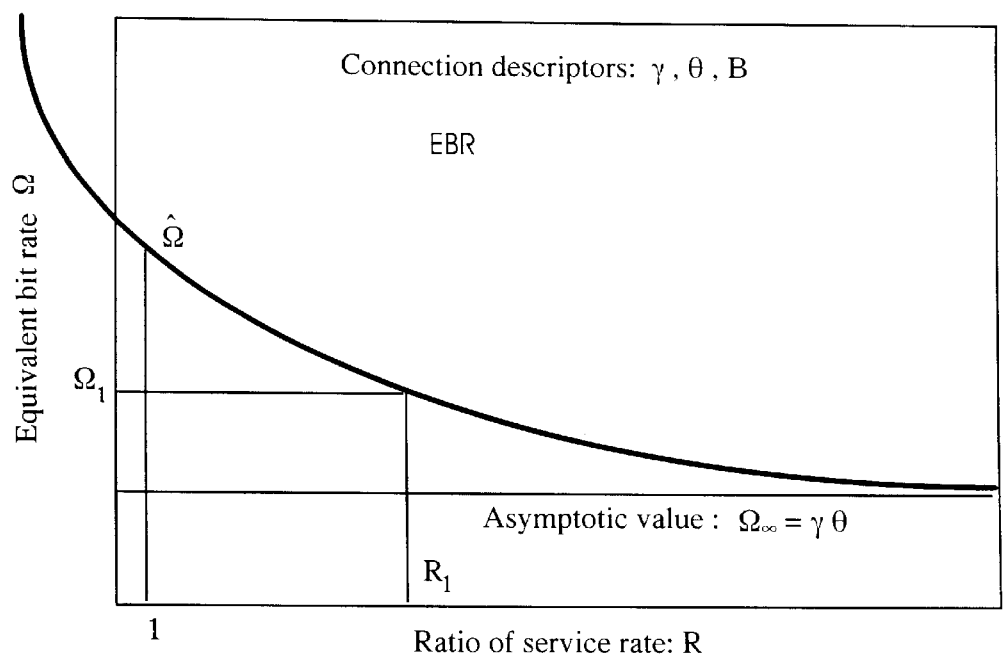
FIG. 14 is a graph illustrating a method used for minimizing processing required to compute equivalent bit rates as connections are established across a multi-class digital network in accordance with the invention.

FIG. 14 shows a graph of a hyperbolic interpolator in accordance with the invention. Using the interpolator, when an edge node 22 receives a traffic admission request, it computes an EBR value for the connection using the capacity $R_1$ of one of the links which the node control element 28 found to have adequate free capacity for the admission connection request. Thereafter, the node control element computes values for $\Omega_\infty$, a, and b, and R using the following formulas:

$$\Omega_\infty = \gamma \theta;$$

where $\gamma$ is the peak rate of the traffic stream requesting admission to the network; and $\theta$ is the proportion of time that the source is active.

The value of b is computed using the formula:

$$b + \gamma = (R_1 - \gamma)\frac{\Omega_1 - \Omega_\infty}{\hat{\Omega} - \Omega_1}$$

wherein $R_1$ is a selected service rate, as indicated above;

$\hat{\Omega}$ is determined using the Gibbens-Hunt formula, which is well-known in the art; and $\Omega_1$ is determined using the extended Gibbens-Hunt method described in U.S. patent application Ser. No. 08/723,649 filed Oct. 3, 1996 and entitled ADMISSION CONTROL IN AN ATM SWITCHING NODE, which is incorporated herein by reference. Although the above-referenced application is related only to ATM networks, the methods it teaches are also applicable to unfragmented variable-sized packets.

The value of a is computed using the formula:

$$a = (b+\gamma)(\hat{\Omega} - \Omega_\infty).$$

The values of $\Omega_\infty$, a and b are then passed in the service admission request message to other nodes involved in connection setup. On receipt of those values, the following formula is used compute the approximated EBR:

$$\Omega = \Omega_\infty + \frac{a}{R + b}$$

where:

$\Omega$ is an approximate EBR; and

R is the link capacity of the link selected in response to the traffic admission request.

Using the formula a node is enabled to compute an approximated EBR with much less computational effort than recomputing EBR using the extended Gibbens-Hunt method or some other similar method. This significantly speeds up traffic admission request processing and thereby enhances overall network efficiency. This method is particularly useful in establishing multicast connections since dozens or hundreds of EBRs may have to be computed in order to establish the multicast connections. Using this method significantly improves the efficiency of processing traffic admission requests for multicast connections.

The invention therefore provides a multi-class network which is capable of transmitting variable-size packets without packet deconstruction. The multi-class network operates efficiently with reliable quality assurance. Since admission control, connection routing and service-rate control are distributed at the node level of the network, control messaging overhead is minimized and network resources are available for transport functions.

Modifications of the above-described embodiments will no doubt become apparent to those skilled in the art. The scope of the invention is therefore intended to be limited solely by the scope of the appended claims.

We claim:

1. A multi-class network comprising:
    a plurality of nodes interconnected by links, each of said plurality of nodes having a node controller; and
    a network control element in communication with the node controller of each of said plurality of nodes,
    wherein
    said network is partitioned into network bands;
    and wherein
    each of said links belongs to at least one of said network bands;
    and wherein
    said network control element is operable to generate a route set that includes alternate routes from each origin node to each destination node associated with a specified network band;
    and wherein
    said network control element is adapted to sort the alternate routes of a route set, from each origin node to each destination node, according to cost ellipses in which a specified origin node and a specified destination node are placed at the two foci of a set of cost ellipses, routes along intermediate nodes are sorted according to cost, and a route is chosen from all routes having cost which fall between defined elliptical cost boundaries.

2. The network of claim 1 wherein the total capacity of each of said links is adaptively divided among said network bands to which each of said links belongs.

3. The network of claim 2 wherein each of said plurality of nodes uses rate controllers to divide the capacity of each of said links into bands according to service-rate allocations determined by a node control element associated with each of said plurality of nodes.

4. The network of claim 1 wherein each of said plurality of network bands applies a band specific muting scheme.

5. The network of claim 1 wherein each of said plurality of network bands applies a band specific a admission-control process.

6. The network of claim 1 wherein each network band performs band specific operational measurements.

7. The network of claim 1 wherein each network band sets band specific tariff setting and billing procedures.

* * * * *